3,256,285
PROCESS FOR IMPROVING THE PIGMENT PROPERTIES OF SUBSTITUTED LINEAR QUINACRIDONES
Otto Fuchs and Aloys Kirsch, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 29, 1962, Ser. No. 198,479
Claims priority, application Germany, June 13, 1961, F 34,147
2 Claims. (Cl. 260—279)

The present invention relates to a process for improving the pigment properties of substituted linear quinacridones.

Processes are known for preparing substituted linear quinacridones by either heating the corresponding substituted 2,5-diarylamino-3,6-dihydro-terephthalic acid esters in high-boiling solvents and subsequently oxidizing the primarily formed dihydroquinacridone (cf. U.S. Patents Nos. 2,821,529 and 2,821,530) or cyclizing the substituted 2,5-diarylaminoterephthalic acids with boric acid (cf. H. Liebermann, Liebigs Annalen der Chemie 518, pages 245 to 251), with anhydrous hydrofluoric acid (French Patent No. 1,245,971), with anhydrous metal halides (cf. French Patent No. 1,253,985) or with polyphosphoric acid (cf. Belgian Patent No. 583,317).

In these known processes, the substituted crude quinacridones are obtained in a form in which they agglomerate on drying to coarse crystalline hard granules which are not suitable for being used as pigment dyestuffs.

While the processes for converting the unsubstituted linear quinacridone into the pure crystal phases lead simultaneously to fine crystalline products having a soft grain, the substituted crude quinacridones, which cannot be converted into another crystal phase since they crystallize in one structure only, must be subjected to a separate treatment in order to obtain them in a form in which they are suitable for being used as pigment dyestuffs.

It is known that such substituted crude quinacridones having a hard grain can be brought into the desired form of fine subdivision by grinding them in the presence of water-soluble inorganic salts such as sodium chloride or sodium sulfate while eventually adding small amounts of organic solvents (cf. U.S. Patent No. 2,821,530) or by grinding them in a roller mill and kneading the pre-ground product together with 4 to 10 times the amount by weight of an organic solvent such, for example, as acetone, dimethylformamide and tetrachloroethylene (cf. U.S. Patent No. 2,857,400). These known processes, however, do not allow the working up of the aqueous pastes in which the crude quinacridone, as a result of its preparation, is mostly present in a very fine state of subdivision. They rather require a drying of the crude quinacridone whereby the particles are hardened and become coarse so that they must be subjected to milling. Moreover, these processes require expensive apparatus and long periods of processing.

Now we have found that the pigment properties of substituted linear quinacridones existing in one crystal phase only and corresponding to the general formula

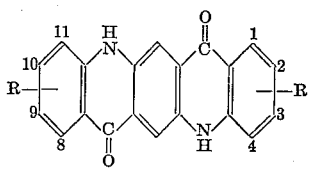

in which the substituents R represent halogen atoms, alkyl, aryl, alkoxy or phenoxy groups or anellated aromatic or heterocyclic rings, can be improved to a large extent by heating for about 30 minutes to 5 hours, at about 80° to 150° C., the aqueous pastes of the crude quinacridones in a very fine state of subdivision with a quantity by weight of an organic solvent amounting to about 4 to 10 times the weight of the quinacridone calculated as of 100 percent strentgh. The substituted quinacridones obtained in this very simple and readily practicable manner do not agglomerate and harden when being dried and meet all requirements made on pigments as regards softness of grain and fine distribution.

The process is advantageously carried out by making into a paste, in a stirring vessel, the wet crude quinacridone which has been freed from the unreacted starting product by a short heating with dilute aqueous alkali lyes and washed until neutral with a quantity by weight of an organic solvent amounting to about 4 to 10 times the weight of the crude quinacridone and heating the paste for about 30 minutes to 5 hours at a temperature within the range of about 80° and 150° C. At a temperature of 100° C. and higher, the water is either distilled off or the heating is conducted under pressure. When applying a temperature exceeding the boiling point of the organic solvent used, it is necessary, of course, to work under pressure, too.

The solvent is used in an amount such that a stirrable paste is obtained and all dyestuff particles come into contact with the solvent. For working up, the mixture is added by water, dilute mineral acid, methanol or ethanol, depending upon the solvent used, and the pigment is filtered off, washed and dried. High-boiling solvents are advantageously washed out with low boiling solvents.

As organic solvents, there may practically be used all organic liquids coming within this term which, under the conditions of the present process, do not or hardly dissolve the substituted quinacridones, for example hydrocarbons and the halogen and nitro substitution products thereof, furthermore mono- and polyhydric alcohols and phenols, ethers, ketones, carboxylic acids, carboxylic acid esters, N-substituted carboxylic acid amides or aliphatic, aromatic and heterocyclic bases.

Wet pastes of substituted crude quinacridones in which the dyestuffs are already present in a very fine state of subdivision and which, according to the present invention, are well suitable for the conversion into soft-grain pigments having a good coloring strength are obtained by cyclizing the corresponding substituted 2,5-diarylaminoterephthalic acids in polyphosphoric acid, anhydrous hydrofluoric acid, titanium tetrachloride or in an aluminum chloride/sodium chloride melt or by dissolving and reprecipitating the crude quinacridones prepared by any known process in concentrated mineral acid such as sulfuric acid or polyphosphoric acid, or in an alcoholic alkali lye.

In comparison with the aforementioned known processes, the present process offers considerable advantages. For example, the new process permits the working up of the aqueous pastes of the crude quinacridones obtained as a result of the condensation, thus saving the drying of the pastes and the expensive and time-consuming milling of the coarse, hard particles. By using aqueous pastes, the state of fine subdivision in which the crude quinacridones are obtained is maintained so that by the influence of the solvent, at a relatively low temperature and under technically simple conditions, the crude quinacridones are converted within a short period of time into a crystal form in which they can be used as pigments after drying. The quinacridone pigments prepared according to the present invention possess a high degree of fine distribution and a soft grain. They are excellently suitable for coloring lacquers and plastic masses. As regards the brilliancy of the tint and the tinctorial properties, they are often superior to the quinacridone dyestuffs obtained by grinding.

The following examples serve to illustrate the invention but they are not intended to limit it thereto, the parts being by weight.

*Example 1*

110 parts of wet crude quinacridone (corresponding to 25 parts of dyestuff of 100% strength) prepared by condensation of 2,5-di-(p-toluidino)-terephthalic acid with polyphosphoric acid were stirred for 1 hour, at 125° C., in a pressure vessel with 100 parts of ethyl alcohol. After cooling, the dyestuff was filtered off, washed with ethanol and dried at 80° to 100° C. under reduced pressure. The 2,9-dimethyl-quinacridone thus obtained was very suitable for coloring lacquers and plastic masses red violet tints possessing excellent properties of fastness.

When using methanol, propanol, butanol, acetone or tetrahydrofurane instead of ethyl alcohol and working otherwise as described above, there was obtained the same result.

*Example 2*

110 parts of the wet crude quinacridone prepared as described in Example 1 were heated for 3 hours at 110° C. with 125 parts of glacial acetic acid. The dyestuff was filtered off, freed from the glacial acetic acid by washing with methanol and dried at 80° to 100° C. under reduced pressure. There was thus obtained the 2,9-dimethyl-quinacridone in the form of finely divided soft grains possessing excellent pigment properties.

*Example 3*

120 parts of wet crude quinacridone prepared from 2,5-di-(3'-chloroanilino)-terephthalic acid and polyphosphoric acid (corresponding to 20 parts of dyestuff of 100% strength) were heated, while stirring and simultaneously distilling off the water, with 150 parts of diethylene glycol monoethyl ether until a temperature of 130° to 135° C. was reached. After cooling, the suspension was diluted with 150 parts of methanol, the dyestuff was filtered off, washed with methanol and dried at 80° to 100° C. under reduced pressure. The pigment thus obtained in a form of fine subdivision colored lacquers and plastic masses bluish red tints of excellent properties of fastness.

When using dichlorobenzene, nitrobenzene, anisole, dimethylformamide or N-methylpyrrolidone instead of ethyldiglycol and proceeding otherwise as described above, there was obtained the same result.

*Example 4*

100 parts of a wet crude quinacridone prepared by cyclization of 2,5-di-(4'-bromanilino)-terephthalic acid with polyphosphoric acid were refluxed for 3 hours, while stirring, with 125 parts of tertiary butanol. After filtering, washing with methanol and drying under reduced pressure, the 2,9-dibromo-quinacridone was obtained as a soft-grain red violet powder which was excellently suitable as pigment dyestuff.

*Example 5*

In a stirring vessel, 60 parts of wet crude quinacridone prepared by condensation of 2,5-bis-(2',4'-dichloroanilino)-terephthalic acid with polyphosphoric acid were refluxed for 30 minutes in a stirring vessel with 150 parts of ethyl alcohol. After filtering and drying under reduced pressure, 20 parts of a pigment possessing a very soft grain were obtained which colored lacquers and plastic masses scarlet red tints.

*Example 6*

120 parts of wet 2,9-diphenoxy-quinacridone (corresponding to 25 parts of dyestuff of 100% strength) prepared by condensation of 2,5-di-(4'-phenoxyanilino) terephthalic acid were heated for 3 hours, while stirring, at 150° C., in a pressure vessel with 125 parts of ethyl alcohol. The dyestuff was filtered off and dried under reduced pressure at 80° to 100° C. It was well suitable for coloring lacquers and plastic masses blue violet tints.

When using glycol, butanediol, glycol monomethyl ether or N-methylacetamide instead of ethyl alcohol and proceeding otherwise as described above, the same result was obtained.

*Example 7*

100 parts of wet crude quinacridone prepared at 150° C. by cyclization of 2,5-di-(4'-chloroanilino)-terephthalic acid with anhydrous hydrofluoric acid were stirred into a paste with 200 parts of diethylene glycol monoethyl ether and heated for 5 hours at 140° C. while stirring and simultaneously distilling off the water. The suspension was then added to 250 parts of methanol, the dyestuff was filtered off, washed with methanol and dried at 80° to 90° C. The 2,9-dichloroquinacridone thus obtained colored lacquers and plastic masses violet tints possessing very good properties of fastness.

*Example 8*

120 parts of a wet crude quinacridone obtained by condensation of 2,5-di-(2'-methoxyanilino)-terephthalic acid with polyphosphoric acid were stirred for 3 hours at 130° C. with 150 parts of quinoline. After cooling, the mixture was given into 1000 parts of sulfuric acid of 10% strength and filtered. The dyestuff thus isolated was washed with water until neutral and dried at 80° to 100° C. under reduced pressure. There were obtained 23 parts of a red pigment which was suitable for coloring lacquers and plastic masses.

Instead of quinoline there was used with an equal result pyridine, cyclohexylamine or triethanolamine.

*Example 9*

50 parts of a crude quinacridone prepared at 190° C. by condensation of 2,5 - bis - (3',5'-dimethylanilino)-terephthalic acid in an aluminum chloride/sodium chloride melt was dissolved at 120° C. in 300 parts of polyphosphoric acid and reprecipitated by introducing the melt into ice water, filtered off and washed until neutral. The wet press cake was stirred for 5 hours at 130° C. with 250 parts of alcohol. After filtering and drying under reduced pressure, there was obtained a soft-grain pigment which colored lacquers and plastic masses bluish red tints.

The following table contains a number of further substituted linear quinacridones which in form of aqueous pastes can be easily brought into such a form of soft grains and fine subdivision that they satisfy all demands on pigments.

| Substituted quinacridone | Tint | Prepared according to Example | Duration of heating, hours |
|---|---|---|---|
| 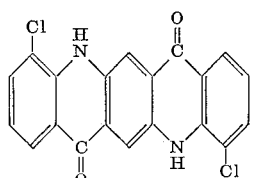 | Orange | 1, 3 | 3 |

| Substituted quinacridone | Tint | Prepared according to Example | Duration of heating, hours |
|---|---|---|---|
| 2,9-dibromo quinacridone | Bluish red | 3 | (1) |
| 2,9-dimethyl quinacridone | Scarlet | 1 | 3 |
| 2,9-dichloro-3,10-dimethyl quinacridone | Bluish red | 3<br>6 | 1·5 |
| 2-chloro-9-methyl-... (Cl, CH₃ substituted) | do | 1 | 3 |
| (H₃C, Cl substituted quinacridone) | Red | 1 | 3 |
| (H₃C, Cl substituted quinacridone) | Scarlet | 1 | 3 |
| (H₃C, Cl substituted quinacridone) | do | 5 | 3 |
| (Cl, CH₃ substituted quinacridone) | do | 1 | 3 |

[1] Until the water is distilled off.

| Substituted quinacridone | Tint | Prepared according to Example | Duration of heating, hours |
|---|---|---|---|
| 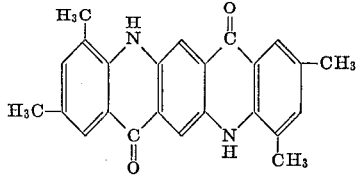 | Bluish red | 3 | (1) |
| 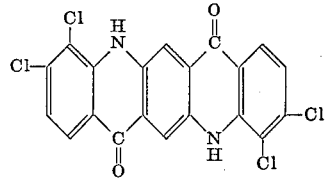 | Orange | 1 | 1 |
| 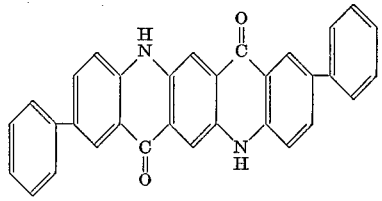 | Violet | 3 | (1) |
| 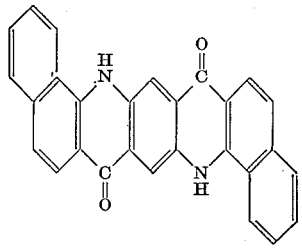 | Yellowish brown | 1 | 3 |
| 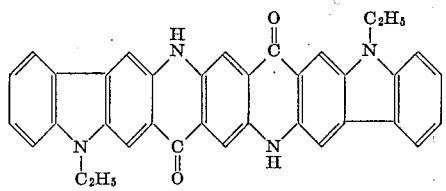 | Olive | 1 | 3 |

[1] Until the water is distilled off.

We claim:
1. A process for improving the pigment properties of linear quinacridones having the formula

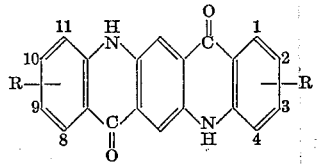

in which R represents a member of the group consisting of chlorine, bromine, alkyl, alkoxy, phenyl, phenoxy, —CH=CH—CH=CH— bound to two adjacent positions and

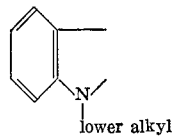

lower alkyl bound to two adjacent positions, which comprises heating an aqueous paste of a crude quinacridone, in which said crude quinacridone is already finely divided, with 4 to 10 times the amount by weight of an organic liquor, calculated on a crude quinacridone of 100% strength, said organic liquor being practically not solvent to the crude quinacridone, for about 30 minutes to about 5 hours at a temperature in the range of from about 80° to about 150° C.

2. A process as defined in claim 1, wherein as an organic liquor being practically not solvent to the crude quinacridone is used a member of the group consisting of diethylene glycol monoethyl ether, dichlorobenzene, nitrobenzene, anisol, ethanol, dimethyl formamide, N-methylpyrrolidone, tert.-butanol, glycol, butane-diol, glycolmonomethylether, N-methylacetamide, quinoline, pyridine, cyclohexylamide and triethanolamide.

References Cited by the Examiner

UNITED STATES PATENTS 2,857,400  10/1958  Cooper _____ 260—279 X (Other references on following page)

UNITED STATES PATENTS

| | | | |
|---|---|---|---|
| 2,982,666 | 5/1961 | Chun | 260—279 |
| 3,006,922 | 10/1961 | Geiger | 260—314.5 |
| 3,007,930 | 11/1961 | Manger et al. | 260—279 |
| 3,016,384 | 1/1962 | Caliezi | 260—279 |
| 3,020,279 | 2/1962 | Woodlock et al. | 260—279 |
| 3,074,950 | 1/1963 | Deuschel et al. | 260—279 |

FOREIGN PATENTS 1,233,785   5/1960   France.

NICHOLAS S. RIZZO, *Primary Examiner.*

DUVAL T. McCUTCHEN, JOHN D. RANDOLPH, WALTER A. MODANCE, *Examiners.*

DON M. KERR, D. G. DAUS, *Assistant Examiners.*